(12) United States Patent
Kim et al.

(10) Patent No.: US 6,282,343 B1
(45) Date of Patent: Aug. 28, 2001

(54) OPTICAL COUPLER AND METHOD OF MANUFACTURING THE SAME

(75) Inventors: Dug-bong Kim, Pusan; Jung-hwan Cho, Seoul; Sang-yun Yi, Yongin; Tae-hyung Rhee, Sungnam, all of (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/440,931

(22) Filed: Nov. 16, 1999

(30) Foreign Application Priority Data

Nov. 17, 1998 (KR) .................................. 98-49219

(51) Int. Cl.⁷ ..................................................... G02B 6/42
(52) U.S. Cl. .................. 385/45; 385/39; 385/15; 385/14
(58) Field of Search .................. 385/45, 39, 15, 385/42, 43, 44, 46, 14

(56) References Cited

U.S. PATENT DOCUMENTS

| | | | |
|---|---|---|---|
| 4,760,580 | * | 7/1988 | Thompson et al. ..................... 375/50 |
| 4,953,935 | * | 9/1990 | Suchoski, Jr. et al. ............... 359/120 |
| 5,226,100 | * | 7/1993 | Maerz ..................................... 385/45 |
| 5,297,233 | * | 3/1994 | Lerminiaux ............................. 385/27 |
| 5,539,847 | * | 7/1996 | Lerminiaux et al. .................. 385/45 |
| 5,542,014 | * | 7/1996 | Lerminiaux et al. .................. 385/45 |

* cited by examiner

*Primary Examiner*—Rodney Bovernick
*Assistant Examiner*—Sung Pak
(74) *Attorney, Agent, or Firm*—Robert E. Bushnell, Esq.

(57) ABSTRACT

An optical coupler and a method of manufacturing the same are provided. The optical coupler includes an input optical waveguide and N output optical waveguides, and divides an optical signal received from the input optical waveguide into N optical signals. The optical coupler further includes a plurality of Y-junction optical waveguide modules configured in m stages, for branching the received optical signal into two optical signals at each stage, and a plurality of curved optical waveguides alternately connected to the Y-junction optical waveguide modules, at least one curved optical waveguide connected between Y-junction optical waveguide modules in the m-th stage and the output optical waveguides, wherein when the guiding direction of the optical signal is set to be the longitudinal axis, and the junction between the input optical waveguide and the first-stage Y-junction optical waveguide module is set to be the starting point, the positions and sizes of the Y-junction optical waveguide modules and the curved optical waveguides are determined in order to minimize the longest path among N paths ranging from the starting point to each of the output optical waveguides. An optical coupler is manufactured using Y-junction optical waveguide modules and connection optical waveguide modules, such that various Y-junction optical waveguide structures can be designed. Also, the degree of freedom upon layout of modules is increased, so that design of the optical coupler is easy.

26 Claims, 8 Drawing Sheets

OPTICAL COUPLER AND METHOD OF MANUFACTURING THE SAME

This application makes reference to, incorporates the same herein, and claims all benefits accruing under 35 U.S.C. § 119 from an application entitled OPTICAL COUPLER AND ITS FABRICATION METHOD earlier filed in the Korean Industrial Property Office on the 17$^{th}$ day of November 1998 and there duly assigned Ser. No. 49219/1998, a copy of which is annexed hereto.

BACKGROUND OF THE INVENTION

1. Technical Field

The present invention relates to an optical coupler and a method of manufacturing the same, and more particularly, to an optical coupler having Y-junction optical waveguides between input and output optical waveguides.

2. Related Art

Optical couplers, optical devices for dividing an optical signal into a plurality of optical signals, are the heart of an optical subscriber network. Optical couplers can be manufactured by thermally uniting two optical fibers, which requires a large amount of manual work. Thus, the manufacturing cost can be high, and direct use of the optical fibers can increase the size of the manufactured optical couplers.

I have found that an improved optical coupler would be desirable, and that efforts have been made to improve optical couplers. Exemplars of recent efforts in the art include U.S. Pat. No. 5,222,167 for OPTICAL COUPLER AND METHOD OF MANUFACTURING issued to Jean et al. and U.S. Pat. No. 4,165,225 for DISTRIBUTOR FOR OPTICAL SIGNALS issued to Auracher et al.

While these recent efforts provide advantages, I note that they fail to adequately provide a convenient and efficient optical coupler.

SUMMARY OF THE INVENTION

An objective of the present invention is to provide an improved optical coupler. A further objective of the present invention is to provide an optical coupler in which the number of output optical waveguides can be easily increased by modularizing an off-axis optical coupler using Y-junction optical waveguides and curved optical waveguides for connecting the Y-junction optical waveguides, and a method of manufacturing the same.

Accordingly, to achieve the above objectives and others, the present invention provides an optical coupler including an input optical waveguide and N output optical waveguides, for dividing an optical signal received from the input optical waveguide into N optical signals, the optical coupler comprising: a plurality of Y-junction optical waveguides configured in m stages, for branching the received optical signal into two optical signals at each stage; and a plurality of curved optical waveguides alternately connected to the Y-junction optical waveguides, at least one curved optical waveguide connected between Y-junction optical waveguides in the m-th stage and the output optical waveguides, wherein when the guiding direction of the optical signal is set to be the longitudinal axis, and the junction between the input optical waveguide and the first-stage Y-junction optical waveguide is set to be the starting point, the positions and sizes of the Y-junction optical waveguides and the curved optical waveguides are determined in order to minimize the longest path among N paths ranging from the starting point to each of the output optical waveguides.

To achieve the above objectives and others, the present invention provides a method of designing a pattern mask for an optical coupler including an input optical waveguide, N output optical waveguides, a plurality of Y-junction optical waveguides configured in m stages for branching an optical signal received by the input optical waveguide into two optical signals at each stage, and a plurality of curved optical waveguides alternately connected to the Y-junction optical waveguides, at least one curved optical waveguide connected between Y-junction optical waveguides at the m-th stage and the output optical waveguides, and manufacturing the optical coupler according to the mask pattern, the method comprising the steps of: (a) determining the lengths, widths and branching angles of the Y-junction optical waveguides, and forming Y-junction optical waveguide modules having sizes depending on the determined lengths, widths and branching angles of the Y-junction optical waveguides; (b) forming connection optical waveguide modules having sizes depending on the radius of curvature and inside angle of each of the curved optical waveguides, for connecting the Y-junction optical waveguides to each other and connecting the m-th Y-junction optical waveguide modules to the output optical waveguides; (c) arranging the Y-junction optical waveguide modules and the curved optical waveguide modules between the input optical waveguide and each of the output optical waveguides, after determining the lengths of the connection optical waveguide modules and the positions of the Y-junction optical waveguide modules and the connection optical waveguide modules so that the longitudinal distance between the starting point and each of the output optical waveguides is minimized, when the junction between the input optical waveguide and the first-stage Y-junction optical waveguide is set to be the starting point, and the guiding direction of the optical signal is set to be along the longitudinal axis; and (d) manufacturing the pattern mask according to the arranged structure.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

FIGS. 7A and 7B illustrate a comparison in length between a first 1×32 optical coupler and a second 1×32 optical coupler;

DETAILED DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

As described above, there are problems with optical couplers which are manufactured by thermally uniting optical fibers. In order to solve those problems, an optical coupler using an integrated optics technique can be proposed. The optical coupler using the integrated optics technique is manufactured by forming a fine pattern for the optical coupler on a plane substrate using a similar method to that of manufacturing semiconductor integrated circuits. The method of manufacturing the optical coupler is suitable for mass production, thus lowering the manufacturing cost and downsizing the manufactured optical coupler. Also, this method allows multi-output optical couplers (having 16 or more outputs) to be manufactured without serious difficulty.

An optical coupler having N outputs for one input is called a 1×N optical coupler. The 1×N optical coupler can be formed by connecting 1×2 optical couplers to each other in series. In this case, the number (N) of outlets of the optical coupler is $2^m$ (where m denotes the number of stages of 1×2 optical couplers which are connected to each other in serial, and is expressed as a natural number). For example, a 1×4 optical coupler is formed by connecting a 1×2 optical coupler to each of the two output ports of another 1×2 optical coupler in series. Here, the 1×2 optical coupler includes a Y-junction optical waveguide which is shaped like the English character "Y", and two curved waveguides for connecting the Y-junction optical waveguide to the two output waveguides. Two types of optical couplers according to how Y-junction optical waveguides are arranged as described below.

One type is an on-axis optical coupler, which arranges Y-junction optical waveguides in parallel to the longitudinal axis, that is, in the direction in which light travels. The other type is an off-axis optical coupler, which arranges Y-junction optical waveguides so that the Y-junction optical waveguides are not parallel to the longitudinal axis.

Figure 1A:
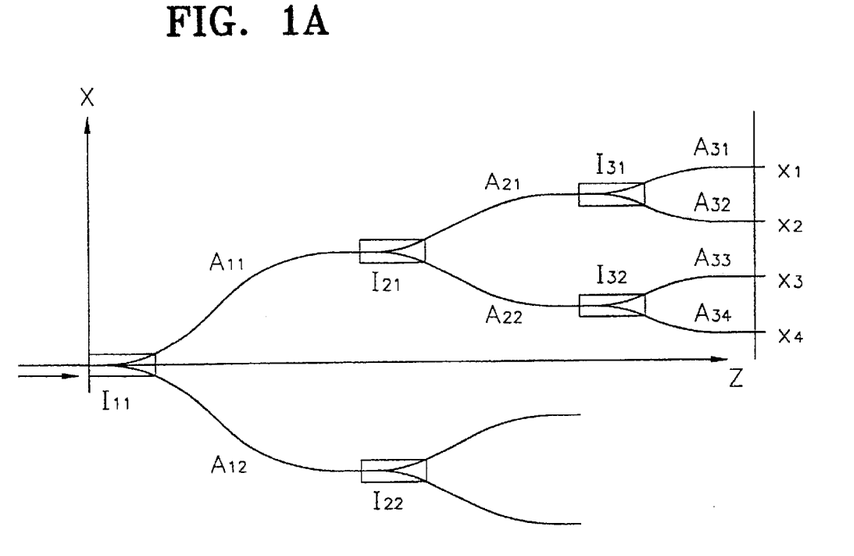
FIG. 1A is a view illustrating a first structure of optical couplers.

FIG. 1A shows the structure of an on-axis optical coupler. The optical coupler shown in FIG. 1A is formed by laying out the Y-junction optical waveguides in a direction which is parallel to the longitudinal axis Z in accordance with the number of stages and connecting the inputs and outputs of the Y-junction optical waveguides to each other via connection optical waveguides which are curved waveguides. In FIG. 1A, $I_{xy}$ denotes Y-junction optical waveguides, $A_{xy}$ denotes connection optical waveguides, and $X_x$ denotes output optical waveguides.

However, the optical coupler shown in FIG. 1A has a problem in that it is long. Generally, a variation in the lateral displacement of a trajectory must be kept small to reduce the bending loss of the curved optical waveguide. The on-axis optical coupler must make the terminal of the connection waveguide parallel to the longitudinal axis Z, in order to connect two laterally-separated Y-junction optical waveguides to each other in parallel to the longitudinal axis. Here, if the variation in the lateral displacement is kept small, the longitudinal length of the connection optical waveguide increases. Consequently, the total length of the device is increased by the length required to make the Y-junction optical waveguides parallel to each other. Such an increase in the length of the device degrades the yield, thus increasing the manufacturing cost. The pattern uniformity required within the device is increased, thus deteriorating the performance of the device.

Figure 1B:
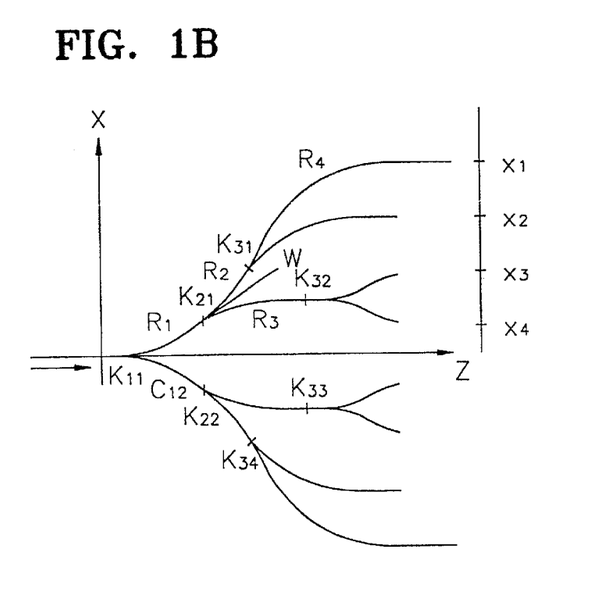
FIG. 1B is a view illustrating a second structure of optical couplers.

FIG. 1B shows the structure of an off-axis optical coupler. The optical coupler shown in FIG. 1B is manufactured by determining the path of an outermost optical waveguide for the optical coupler, determining the positions on the path at which Y-junction optical waveguides are placed, and forming Y-junction optical waveguides by drawing virtual symmetrical axes (for example, W) which contact the optical waveguide paths (for example, $R_2$) at the determined positions and drawing curved lines (for example, $R_3$) which are symmetrical about the virtual symmetrical axes with respect to the optical waveguide paths. In FIG. 1B, $K_{xy}$ denotes a Y-junction optical waveguide, $R_x$ denotes the radius of a curved optical waveguide, and $X_x$ denotes an output optical waveguide.

The outermost optical waveguide generally adopts a circular arc optical waveguide, so that a Y-junction optical waveguide, to be formed along a curved line, is formed between the circular arcs $R_2$ and $R_3$ of two contacting circles as shown in FIG. 1B. Here, the central axis of the Y-junction optical waveguide is no longer parallel to the longitudinal axis Z.

However, the optical coupler shown in FIG. 1B incorporates Y-junction optical waveguides and curved optical waveguides, such that the structures of the Y-junction optical waveguides are formed unilaterally by the curved optical waveguides. Also, the positions of the Y-junction optical waveguides on the outermost curved optical waveguide must be determined so that the end of each path branched on the Y-junction optical waveguide accurately meets each output optical waveguide. However, this position determination is also required by each of the Y-junction optical waveguides in the next stages, thus greatly restricting the position of each of the Y-junction optical waveguides on each path. Therefore, a Y-junction optical waveguide must be located at a predetermined position, so that even a small amount of position adjustment is very difficult, and the degree of freedom in terms of design is thus lowered. Such a difficulty becomes serious with an increase in the number of output optical waveguides. In other words, more paths must be branched from the interior of the outermost optical waveguide in order to increase the number of output optical waveguides. Here, the positions of the Y-junction optical waveguides on each branched optical waveguide must be determined so that the end of each path correctly meets the input of each of the output optical waveguides which are spaced a predetermined distance apart from each other. However, in the case of the off-axis optical coupler, the position determination of a Y-junction optical waveguide is achieved through trial and error due to intuitional judgement. Accordingly, the number of Y-junction optical waveguides in their position increases with an increase in the number of output optical waveguides. Thus, the position determination of the Y-junction optical waveguides using this method is difficult.

Figure 2:
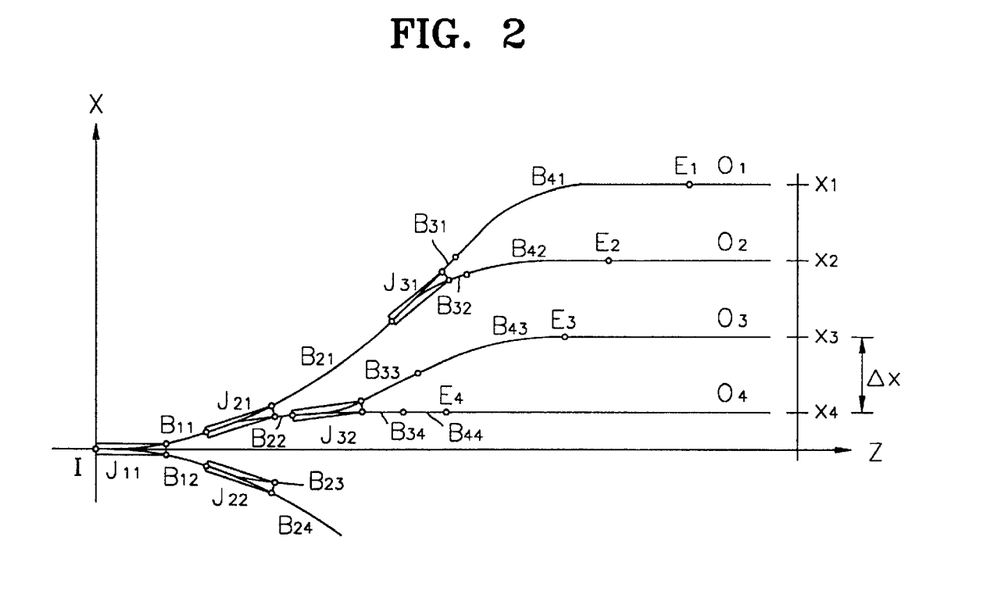
FIG. 2 is a view illustrating the structure of an optical coupler, in accordance with the principles of the present invention.

Referring to FIG. 2 showing a 1×N optical coupler according to the present invention, the optical coupler has a 1×8 structure provided with 8 output waveguides. The optical coupler according to the present invention has a longitudinally symmetrical structure, and FIG. 2 shows only four upper optical waveguides. The optical coupler shown in FIG. 2 includes an input optical waveguide I, N output optical waveguides $O_x$, a plurality of Y-junction optical waveguide modules $J_{xy}$, and a plurality of connection optical waveguide modules $B_{xy}$. The shown circles ○ denote junctions. The Y-junction optical waveguide modules $J_{xy}$ are connected to each other in m stages. For example, in the case of a 1×8 optical coupler, the Y-junction optical waveguide modules $J_{xy}$ are connected to each other in three stages.

The input optical waveguide I is a straight line optical waveguide which is placed on the longitudinal axis Z. The output optical waveguides $O_x$, straight line optical waveguides separated by equal intervals Δx, transmit an optical signal to an output optical fiber. The lateral positions of the output optical waveguides $O_x$ are $x_1$, $X_2$, $X_3$ and $x_4$, respectively.

The Y-junction optical waveguide modules $J_{xy}$ each have one inlet and two outlets, and are defined by the length, the width and the branching angle. Each of the Y-junction optical waveguide modules $J_{xy}$ is located on a path between the input optical waveguide I and each of the output optical waveguides $O_x$, and branches an input optical signal into two optical signals. Here, the Y-junction optical waveguide modules $J_{xy}$ need not be parallel to the Z-axis.

The connection optical waveguide modules $B_{xy}$ connect the Y-junction optical waveguide modules $J_{xy}$ to each other, and at least one connection optical waveguide module is connected between the m-th stage and each of the output optical waveguides $O_x$. In the present embodiment, two connection optical waveguide modules are connected between the m-th stage and each of the output optical waveguides $O_x$. Each of the connection optical waveguide modules $B_{xy}$ outputs the optical signals branched by the Y-junction optical waveguide modules $J_{xy}$, to a Y-junction optical waveguide module $J_{xy}$ on the next stage or the output optical waveguides $O_x$.

$E_x$ denotes the end point of each of the connection optical waveguide modules which are connected to the output optical waveguides. The junctions ○ include junctions between the input optical waveguide and each of the Y-junction optical waveguide modules $J_{xy}$, junctions between the Y-junction optical waveguide modules $J_{xy}$ and the connection optical waveguide modules $B_{xy}$, and junctions between the connection optical waveguide modules $B_{xy}$. The junctions ○ should meet the following restriction conditions: 1) coordinate matching between the outlet of a module and the inlet of a module on the next stage; 2) tangent inclination matching between the outlet of a module and the inlet of a module on the next stage; and 3) curvature matching between the outlet of a module and the inlet of a module on the next stage, in order to prevent scattering of guided light and distortion of the wave plane of the guided light.

In order to manufacture an optical coupler having the above-described structure, first, the number N of output optical waveguides for the optical coupler and the interval Δx between adjacent output optical waveguides should be determined.

Figure 3:
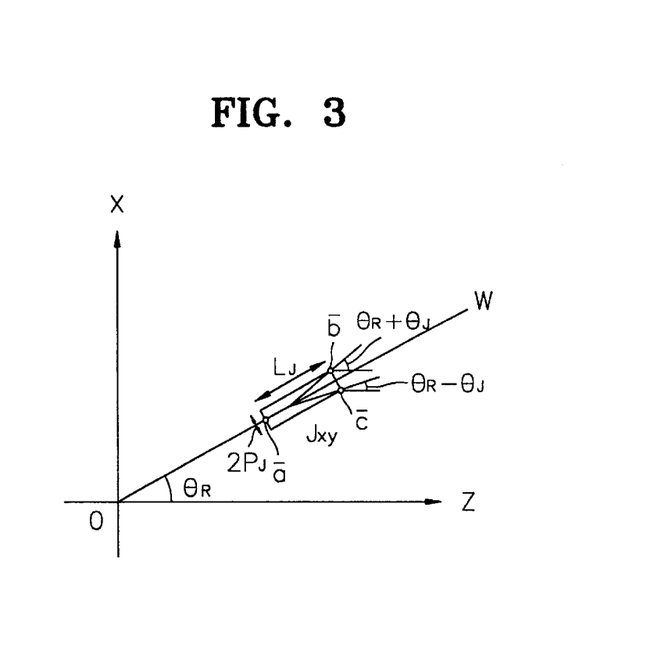
FIG. 3 is a view illustrating the structure of the Y-junction optical waveguide module of FIG. 2, in accordance with the principles of the present invention.

As shown in FIG. 3, the length $L_J$, the half width $P_J$, and the branching angle $\theta_J$ of the Y-junction optical waveguide module $J_{xy}$ are determined to design the Y-junction optical waveguide modules $J_{xy}$. FIG. 3 shows the structure of a Y-junction optical waveguide module $J_{xy}$. Here, $\bar{a}$ denotes an inlet, and $\bar{b}$ and $\bar{c}$ denote the outlets. The branching angle $\theta_J$ denotes the intermediate angle between the axis of symmetry W and a tangent line at the upper outlet point $\bar{b}$ of a Y-junction module.

The outlet coordinate ($\bar{b}$, $\bar{c}$) of a Y-junction module rotated by $\theta_R$ from the longitudinal axis is determined by the following Equation 1:

$$\bar{b} = \bar{a} + \begin{pmatrix} \cos\theta_R & -\sin\theta_R \\ \sin\theta_R & \cos\theta_R \end{pmatrix}\begin{pmatrix} L_J \\ P_J \end{pmatrix} = \bar{a} + \begin{pmatrix} L_J\cos\theta_R - P_J\sin\theta_R \\ L_J\sin\theta_R + P_J\cos\theta_R \end{pmatrix} \quad (1)$$

$$\bar{c} = \bar{a} + \begin{pmatrix} \cos\theta_R & -\sin\theta_R \\ \sin\theta_R & \cos\theta_R \end{pmatrix}\begin{pmatrix} L_J \\ -P_J \end{pmatrix} = \bar{a} + \begin{pmatrix} L_J\cos\theta_R + P_J\sin\theta_R \\ L_J\sin\theta_R - P_J\cos\theta_R \end{pmatrix}$$

wherein the outlet angle at the outlet $\bar{b}$ of the Y-junction module rotated by $\theta_R$ is $\theta_R+\theta_J$, and the outlet angle at the outlet $\bar{c}$ is $\theta_R-\theta_J$.

Next, the radii R of circular arc optical waveguides are determined to design connection optical waveguide modules. The radii of the circular arc optical waveguides can be set to be different from each other or the radii themselves can be set to be unknown variables. However, the present embodiment assumes that all of the circular arc optical waveguides have the same radius.

A circular arc optical waveguide can be used as the connection optical waveguide according to the present invention. Preferably, a polynomial arc (PA) waveguide is used. The polynomial arc waveguide is a curved waveguide which has the merits of a circular arc optical waveguide and also has corrections to make up for the defects thereof. The circular arc optical waveguide is formed by adopting part of a circle having a radius of curvature of R as an optical waveguide, and can easily be expressed by path equations. However, in a case where circular arc optical waveguides having different curvatures are connected, transition loss and wave plane distortion due to curvature mismatch occur at the junctions.

The paths of the polynomial arc optical waveguide can be defined by a longitudinal axis polynomial z(t) and a lateral axis polynomial x(t) each expressed as a fifth degree polynomial with respect to a parameter (t). The coefficients of each term of each equation are determined by the boundary conditions at the inlet/outlets of a curved optical waveguide, that is, by the coordinate matching, the tangent inclination matching, and the curvature matching. However, many parameters to be derived make it difficult to use the polynomial arc optical waveguide as the connection optical waveguide module for the optical coupler. Accordingly, in the present embodiment, a circular arc optical waveguide is selected as the connection optical waveguide and parameters are derived, in the parameter deriving step to design the optical coupler, and the circular arc optical waveguide is then substituted by a curvature-matched polynomial arc optical waveguide.

Figure 4:
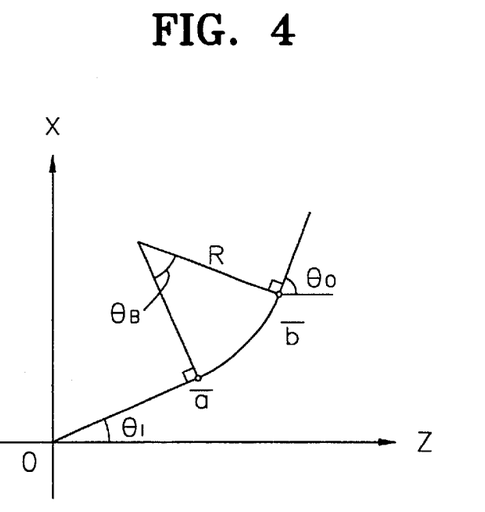
FIG. 4 is a view illustrating a connection optical waveguide module using a circular arc optical waveguide.

FIG. 4 shows a connection optical waveguide module using a circular arc optical waveguide. Here, $\overline{a}$ denotes an inlet, and $\overline{b}$ denotes an outlet. The connection optical waveguide module is defined by the inside angle $\theta_B$ and the radius of curvature R of a circle of which part of the arc is the connection optical waveguide. Here, the inside angle $\theta_B$ is obtained by subtracting the tangent angle $\theta_1$ of the optical waveguide inlet from the tangent angle $\theta_0$ of the optical waveguide outlet. The outlet position $\overline{b}$ of a connection optical waveguide rotated by $\theta_1$ is determined by R and $\theta_B$ with respect to the inlet position $\overline{a}$, as shown in the following Equation 2:

$$\overline{b} = \overline{a} + \begin{pmatrix} \cos\theta_l & -\sin\theta_l \\ \sin\theta_l & \cos\theta_l \end{pmatrix} \begin{pmatrix} r\sin\theta_B \\ r - r\cos\theta_B \end{pmatrix} = \overline{a} + \begin{pmatrix} 2r\cos\left(\frac{\theta_B}{2} + \theta_l\right)\sin\frac{\theta_B}{2} \\ 2r\sin\left(\frac{\theta_B}{2} + \theta_l\right)\sin\frac{\theta_B}{2} \end{pmatrix} \quad (2)$$

wherein r denotes the radius of curvature which has a sign, which is defined as R·sign $\theta_B$. The sign of r, the sign of a curvature, is positive if the tangent angle of the connection optical waveguide increases along the path, and negative if the tangent angle decreases, which is determined by the following Equation 3:

$$\text{sign}(\theta_B) = \begin{cases} 1 & \theta_B > 0 \\ 0 & \theta_B = 0 \\ -1 & \theta_B < 0 \end{cases} \quad (3)$$

The paths of an optical coupler formed by sequentially connecting Y-junction optical waveguide modules and connection optical waveguide modules can be expressed by equations derived from Equations 2 and 3. According to Equations 2 and 3, the equations relate to the inside angle of each circular arc optical waveguide. Thus, the size of the connection optical waveguide can be obtained by calculating the solution of the equations, and the positions of the Y-junction optical waveguide modules according to the paths, and the positions of the connection optical waveguide modules can be determined.

Figure 5A:
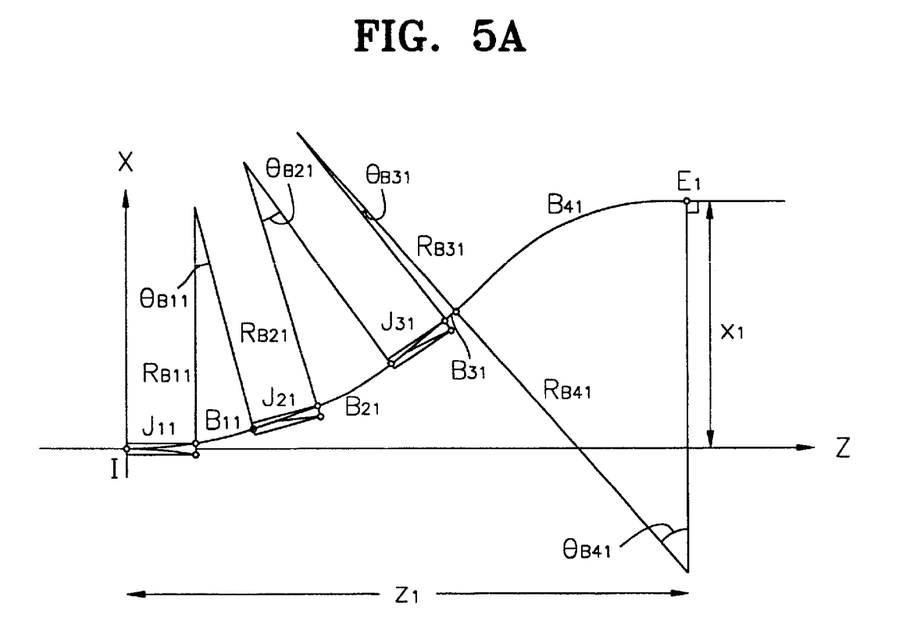
FIGS. 5A through 5D are views illustrating first through fourth paths, respectively, from the start point I of the optical coupler of FIG. 2 to each of the end points $E_1$ through $E_4$ thereof, in accordance with the principles of the present invention.

FIG. 5A shows the first path from the start point I to the end point $E_1$. Referring to FIG. 5A, the first path is $J_{11}$ to $B_{11}$ to $J_{21}$ to $B_{21}$ to $J_{31}$ to $B_{31}$ to $B_{41}$ to $E_1$. The end point coordinates $(z_1, z_1)$ of the first path are defined by the following Equation 4, from the radii of curvature $R_{B11}$, $R_{B21}$, $R_{B31}$ and $R_{B41}$ of circular arcs and the inside angles $\theta_{B11}$, $\theta_{B21}$, $\theta_{B31}$ and $\theta_{B41}$ thereof with respect to the connection optical waveguide modules $B_{11}$, $B_{21}$, $B_{31}$ and $B_{41}$.

$$z_1 = f_1(r_{B11}, r_{B21}, r_{B31}, r_{B41}, \theta_{B11}, \theta_{B21}, \theta_{B31}, \theta_{B41}) \quad (4)$$

$$= L_J + 2r_{B11}\cos\left(\frac{\theta_{B11}}{2} + \theta_J\right)\sin\left(\frac{\theta_{B11}}{2}\right) +$$

$$L_J\cos(\theta_{B11} + \theta_J) - P_J\sin(\theta_{B11} + \theta_J) +$$

$$2r_{B21}\cos\left(\frac{\theta_{B21}}{2} + \theta_{B11} + 2\theta_J\right)\sin\left(\frac{\theta_{B21}}{2}\right) +$$

$$L_J\cos(\theta_{B21} + \theta_{B11} + 2\theta_J) - P_J\sin(\theta_{B21} + \theta_{B11} + 2\theta_J) +$$

$$2r_{B31}\cos\left(\frac{\theta_{B31}}{2} + \theta_{B21} + \theta_{B11} + 3\theta_J\right)\sin\left(\frac{\theta_{B31}}{2}\right) +$$

$$2r_{B41}\cos\left(\frac{\theta_{B41}}{2} + \theta_{B31} + \theta_{B21} + \theta_{B11} + 3\theta_J\right)\sin\left(\frac{\theta_{B41}}{2}\right)$$

$$x_1 = g_1(r_{B11}, r_{B21}, r_{B31}, r_{B41}, \theta_{B11}, \theta_{B21}, \theta_{B31}, \theta_{B41})$$

$$= P_J + 2r_{B11}\cos\left(\frac{\theta_{B11}}{2} + \theta_J\right)\sin\left(\frac{\theta_{B11}}{2}\right) +$$

$$L_J\sin(\theta_{B11} + \theta_J) + P_J\cos(\theta_{B11} + \theta_J) +$$

$$2r_{B21}\sin\left(\frac{\theta_{B21}}{2} + \theta_{B11} + 2\theta_J\right)\sin\left(\frac{\theta_{B21}}{2}\right) +$$

$$L_J\sin(\theta_{B21} + \theta_{B11} + 2\theta_J) + P_J\cos(\theta_{B21} + \theta_{B11} + 2\theta_J) +$$

$$2r_{B31}\sin\left(\frac{\theta_{B31}}{2} + \theta_{B21} + \theta_{B11} + 3\theta_J\right)\sin\left(\frac{\theta_{B31}}{2}\right) +$$

$$2r_{B41}\sin\left(\frac{\theta_{B41}}{2} + \theta_{B31} + \theta_{B21} + \theta_{B11} + 3\theta_J\right)\sin\left(\frac{\theta_{B41}}{2}\right)$$

Since the input optical waveguide and the output optical waveguide are parallel to the longitudinal axis Z, the angle $\theta_1$ accumulated along the first path must be zero as shown in the following Equation 5:

$$\theta_1 = \psi_1(\theta_{B11}, \theta_{B21}, \theta_{B31}, \theta_{B41}) \quad (5)$$

$$= \theta_{B11} + \theta_{B21} + \theta_{B31} + \theta_{B41} + 3\theta_J$$

$$= 0$$

Figure 5B:
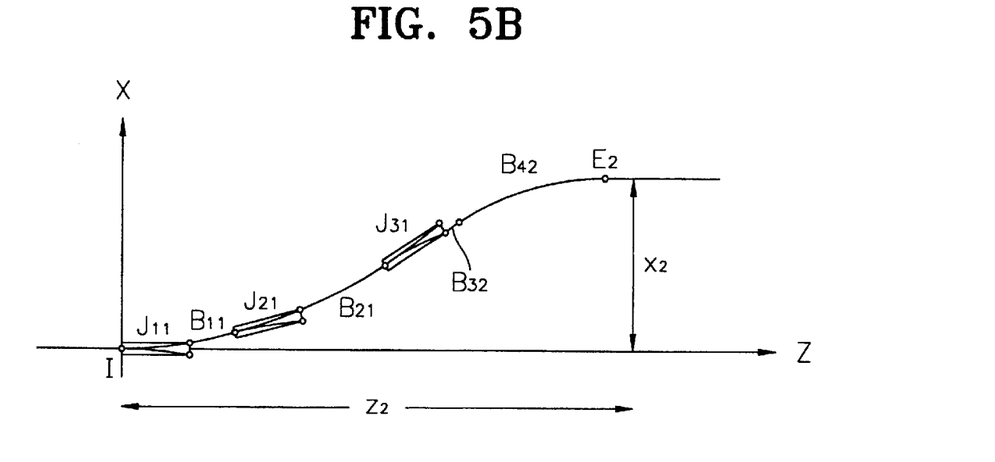

FIG. 5B shows the second path from the start point I to the end point $E_2$. Referring to FIG. 5B, the second path is $J_{11}$ to $B_{11}$ to $J_{21}$ to $B_{21}$ to $J_{31}$ to $B_{32}$ to $B_{42}$ to $E_2$. The end point coordinates $(z_2, x_2)$ of the second path are defined by the following Equation 6, from the radii of curvature $R_{B11}$, $R_{B21}$, $R_{B32}$ and $R_{B42}$ of each circular arc and the inside angles $\theta_{B11}$, $\theta_{B21}$, $\theta_{B32}$ and $\theta_{B42}$ thereof with respect to the connection optical waveguide modules $B_{11}$, $B_{21}$, $B_{32}$ and $B_{42}$:

$$z_2 = f_2(r_{B11}, r_{B21}, r_{B32}, r_{B42}, \theta_{B11}, \theta_{B21}, \theta_{B32}, \theta_{B42}) \quad (6)$$

$$= L_J + 2r_{B11}\cos\left(\frac{\theta_{B11}}{2} + \theta_J\right)\sin\left(\frac{\theta_{B11}}{2}\right) +$$

$$L_J\cos(\theta_{B11} + \theta_J) - P_J\sin(\theta_{B11} + \theta_J) +$$

$$2r_{B21}\cos\left(\frac{\theta_{B21}}{2} + \theta_{B11} + 2\theta_J\right)\sin\left(\frac{\theta_{B21}}{2}\right) +$$

$$L_J\cos(\theta_{B21} + \theta_{B11} + 2\theta_J) + P_J\sin(\theta_{B21} + \theta_{B11} + 2\theta_J) +$$

$$2r_{B32}\cos\left(\frac{\theta_{B32}}{2} + \theta_{B21} + \theta_{B11} + \theta_J\right)\sin\left(\frac{\theta_{B32}}{2}\right) +$$

$$2r_{B42}\cos\left(\frac{\theta_{B42}}{2} + \theta_{B32} + \theta_{B21} + \theta_{B11} + \theta_J\right)\sin\left(\frac{\theta_{B42}}{2}\right)$$

$$x_2 = g_2(r_{B11}, r_{B21}, r_{B32}, r_{B42}, \theta_{B11}, \theta_{B21}, \theta_{B32}, \theta_{B42})$$

$$= P_J + 2r_{B11}\sin\left(\frac{\theta_{B11}}{2} + \theta_J\right)\sin\left(\frac{\theta_{B11}}{2}\right) +$$

$$L_J\sin(\theta_{B11} + \theta_J) + P_J\cos(\theta_{B11} + \theta_J) +$$

$$2r_{B21}\sin\left(\frac{\theta_{B21}}{2} + \theta_{B11} + 2\theta_J\right)\sin\left(\frac{\theta_{B21}}{2}\right) +$$

$$L_J\sin(\theta_{B21} + \theta_{B11} + 2\theta_J) - P_J\cos(\theta_{B21} + \theta_{B11} + 2\theta_J) +$$

$$2r_{B32}\sin\left(\frac{\theta_{B32}}{2} + \theta_{B21} + \theta_{B11} + \theta_J\right)\sin\left(\frac{\theta_{B32}}{2}\right) +$$

$$2r_{B42}\sin\left(\frac{\theta_{B42}}{2} + \theta_{B32} + \theta_{B21} + \theta_{B11} + \theta_J\right)\sin\left(\frac{\theta_{B42}}{2}\right)$$

Since the input optical waveguide and the output optical waveguide are parallel to the longitudinal axis Z, the angle $\theta_2$ accumulated along the second path must be zero as shown in the following Equation 7:

$$\theta_2 = \psi_2(\theta_{B11}, \theta_{B21}, \theta_{B32}, \theta_{B42}) \quad (7)$$
$$= \theta_{B11} + \theta_{B21} + \theta_{B32} + \theta_{B42} + \theta_J$$
$$= 0$$

Figure 5C:
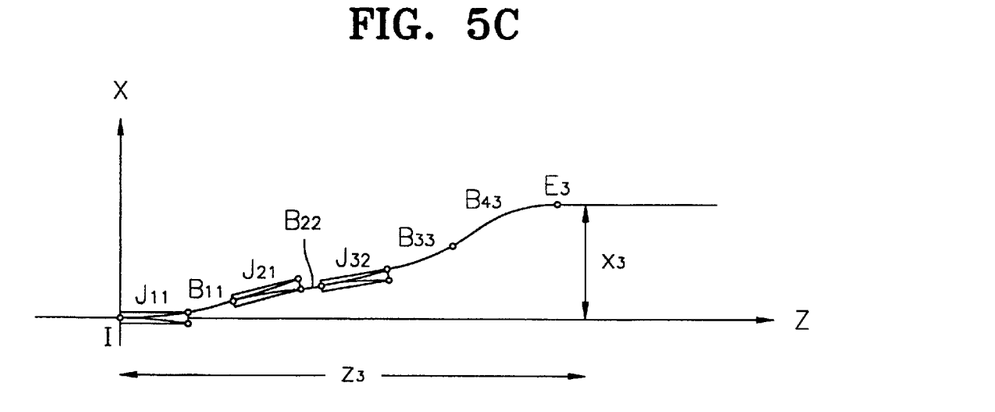

FIG. 5C shows the third path from the start point I to the end point $E_3$. Referring to FIG. 5C, the third path is $J_{11}$ to $B_{11}$ to $J_{21}$ to $B_{22}$ to $J_{32}$ to $B_{33}$ to $B_{43}$ to $E_3$. The terminal point coordinates ($z_3$, $x_3$) of the third path are defined by the following Equation 8, from the radii of curvature $R_{B11}$, $R_{B22}$, $R_{B33}$ and $R_{B43}$ of each circular arc and the inside angles $\theta_{B11}$, $\theta_{B22}$, $\theta_{B33}$ and $\theta_{B43}$ thereof with respect to the connection optical waveguide modules $B_{11}$, $B_{22}$, $B_{33}$ and $B_{43}$:

$$z_3 = f_3(r_{B11}, r_{B22}, r_{B33}, r_{B43}, \theta_{B11}, \theta_{B22}, \theta_{B33}, \theta_{B43}) \quad (8)$$
$$= L_J + 2r_{B11}\cos\left(\frac{\theta_{B11}}{2} + \theta_J\right)\sin\left(\frac{\theta_{B11}}{2}\right) +$$
$$L_J\cos(\theta_{B11} + \theta_J) + P_J\sin(\theta_{B11} + \theta_J) +$$
$$2r_{B22}\cos\left(\frac{\theta_{B22}}{2} + \theta_{B11}\right)\sin(\theta_{B22}OVER2) +$$
$$L_J\cos(\theta_{B22} + \theta_{B11}) - P_J\sin(\theta_{B22} + \theta_{B11}) +$$
$$2r_{B33}\cos\left(\frac{\theta_{B33}}{2} + \theta_{B22} + \theta_{B11} + \theta_J\right)\sin\left(\frac{\theta_{B33}}{2}\right) +$$
$$2r_{B43}\cos\left(\frac{\theta_{B43}}{2} + \theta_{B33} + \theta_{B22} + \theta_{B11} + \theta_J\right)\sin\left(\frac{\theta_{B43}}{2}\right)$$

$$x_3 = g_3(r_{B11}, r_{B22}, r_{B33}, r_{B43}, \theta_{B11}, \theta_{B22}, \theta_{B33}, \theta_{B43})$$
$$= P_J + 2r_{B11}\sin\left(\frac{\theta_{B11}}{2} + \theta_J\right)\sin\left(\frac{\theta_{B11}}{2}\right) +$$
$$L_J\sin(\theta_{B11} + \theta_J) - P_J\cos(\theta_{B11} + \theta_J) +$$
$$2r_{B22}\sin\left(\frac{\theta_{B22}}{2} + \theta_{B11}\right)\sin\left(\frac{\theta_{B22}}{2}\right) +$$
$$L_J\sin(\theta_{B22} + \theta_{B11}) + P_J\cos(\theta_{B22} + \theta_{B11}) +$$
$$2r_{B33}\sin\left(\frac{\theta_{B33}}{2} + \theta_{B22} + \theta_{B11} + \theta_J\right)\sin\left(\frac{\theta_{B33}}{2}\right) +$$
$$2r_{B43}\sin\left(\frac{\theta_{B43}}{2} + \theta_{B33} + \theta_{B22} + \theta_{B11} + \theta_J\right)\sin\left(\frac{\theta_{B43}}{2}\right)$$

Since the input optical waveguide and the output optical waveguide are parallel to the longitudinal axis Z, the angle $\theta_3$ accumulated along the third path must be zero as shown in the following Equation 9:

$$\theta_3 = \psi_3(\theta_{B11}, \theta_{B22}, \theta_{B33}, \theta_{B43}) \quad (9)$$
$$= \theta_{B11} + \theta_{B22} + \theta_{B33} + \theta_{B43} + \theta_J$$
$$= 0$$

Figure 5D:
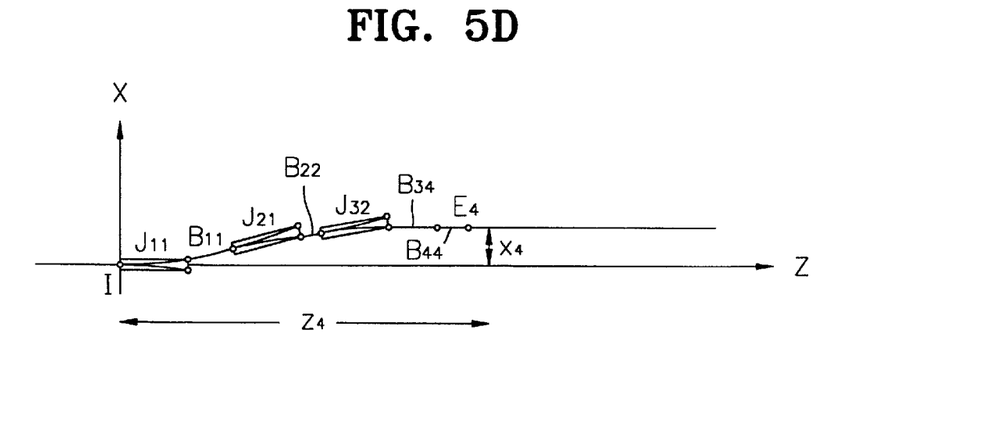

FIG. 5D shows the fourth path from the start point I to the end point $E_4$. Referring to FIG. 5D, the fourth path is $J_{11}$ to $B_{11}$ to $J_{21}$ to $B_{22}$ to $J_{32}$ to $B_{34}$ to $B_{44}$ to $E_4$. The end point coordinates ($z_4$, $z_4$) of the fourth path are defined by the following Equation 10, from the radii of curvature $R_{B11}$, $R_{B22}$, $R_{B34}$ and $R_{B44}$ of each circular arc and the inside angles $\theta_{B11}$, $\theta_{B22}$, $\theta_{B34}$, and $\theta_{B44}$ thereof with respect to the connection optical waveguide modules $B_{11}$, $B_{22}$, $B_{34}$ and $B_{44}$:

$$z_4 = f_4(r_{B11}, r_{B22}, r_{B34}, r_{B44}, \theta_{B11}, \theta_{B22}, \theta_{B34}, \theta_{B44}) \quad (10)$$
$$= L_J + 2r_{B11}\cos\left(\frac{\theta_{B11}}{2} + \theta_J\right)\sin\left(\frac{\theta_{B11}}{2}\right) +$$
$$L_J\cos(\theta_{B11} + \theta_J) + P_J\sin(\theta_{B11} + \theta_J) +$$
$$2r_{B22}\cos\left(\frac{\theta_{B22}}{2} + \theta_{B11}\right)\sin\left(\frac{\theta_{B22}}{2}\right) +$$
$$L_J\cos(\theta_{B22} + \theta_{B11}) + P_J\sin(\theta_{B22} + \theta_{B11}) +$$
$$2r_{B34}\cos\left(\frac{\theta_{B34}}{2} + \theta_{B22} + \theta_{B11} - \theta_J\right)\sin\left(\frac{\theta_{B34}}{2}\right) +$$
$$2r_{B44}\cos\left(\frac{\theta_{B44}}{2} + \theta_{B34} + \theta_{B22} + \theta_{B11} - \theta_J\right)\sin\left(\frac{\theta_{B44}}{2}\right)$$

$$x_4 = g_4(r_{B11}, r_{B22}, r_{B34}, r_{B44}, \theta_{B11}, \theta_{B22}, \theta_{B34}, \theta_{B44})$$
$$= P_J + 2r_{B11}\sin\left(\frac{\theta_{B11}}{2} + \theta_J\right)\sin\left(\frac{\theta_{B11}}{2}\right) +$$
$$L_J\sin(\theta_{B11} + \theta_J) - P_J\cos(\theta_{B11} + \theta_J) +$$
$$2r_{B22}\sin\left(\frac{\theta_{B22}}{2} + \theta_{B11}\right)\sin\left(\frac{\theta_{B22}}{2}\right) +$$
$$L_J\sin(\theta_{B22} + \theta_{B11}) - P_J\cos(\theta_{B22} + \theta_{B11}) +$$
$$2r_{B34}\sin\left(\frac{\theta_{B34}}{2} + \theta_{B22} + \theta_{B11} - \theta_J\right)\sin\left(\frac{\theta_{B34}}{2}\right) +$$
$$2r_{B44}\sin\left(\frac{\theta_{B44}}{2} + \theta_{B34} + \theta_{B22} + \theta_{B11} - \theta_J\right)\sin\left(\frac{\theta_{B44}}{2}\right)$$

Since the input optical waveguide and the output optical waveguide are parallel to the longitudinal axis Z, the angle $\theta_4$ accumulated along the fourth path must be zero as shown in the following Equation 11:

$$\theta_4 = \psi_4(\theta_{B11}, \theta_{B22}, \theta_{B34}, \theta_{B44}) \quad (11)$$
$$= \theta_{B11} + \theta_{B22} + \theta_{B34} + \theta_{B44} - \theta_J$$
$$= 0$$

Eight non-linear simultaneous equations having 11 unknown quantities are obtained from Equations 4 through 11. The 11 unknown quantities are the inside angles of each connection optical waveguide module, and a set U of the 11 unknown quantities is determined to be expressed as $\{\theta^{B11}, \theta_{B21}, \theta_{B22}, \theta_{B31}, \theta_{B32}, \theta_{B33}, \theta_{B34}, \theta_{B41}, \theta_{B42}, \theta_{B43}, \theta_{B44}\}$. Four of the eight non-linear simultaneous equations are lateral moving distance equations, that is, the lateral coordinate values of the end points, $x_i = g_i(\cdots) = ((N+1)/2 - i) \cdot \Delta x$ which are obtained from the boundary conditions with respect to the lateral displacement of the output optical waveguide. The remaining four non-linear simultaneous equations are accumulated angle equations $\theta_i = \psi_i(\cdots) = 0$ which are obtained from the condition in which each accumulated angle value from the input optical waveguide to the output optical waveguide is zero. In this case, the number of unknown quantities is greater than the number of equations, so that several solution sets are obtained.

A set $U_i$ of solutions among the several sets of solutions which minimizes the longitudinal moving distance equations $z_i = f_i(\cdots)$ of Equations 4 through 11, can be obtained by several methods. In the present embodiment, the solution set $U_i$ is obtained by a mathematical optimization technique.

After solution sets $U_1$, $U_2$, $U_3$ and $U_4$ for minimizing each path (i=1, 2, 3 and 4) is obtained, paths each having the maximum longitudinal moving distance, among the four resultant paths obtained by substituting the solution sets $U_1$, $U_2$, $U_3$, and $U_4$ into each of the equations, are compared to select a solution set having the minimum length. That is, a solution set is selected, which satisfies minimum{maximum[$f_1(U_1)$, $f_2(U_1)$, $f_3(U_1)$, $f_4(U_1)$], maximum[$f_1(U_2)$, $f_2(U_2)$, $f_3(U_2)$, $f_4(U_2)$], maximum[$f_1(U_3)$, $f_2(U_3)$, $f_3(U_3)$, $f_4(U_3)$], maximum[$f_1(U_4)$, $f_2(U_4)$, $f_3(U_4)$, $f_4(U_4)$]}.

The sizes of the connection optical waveguide modules are determined from the selected solution set, thus connecting and laying out the Y-junction optical waveguide modules and the connection optical waveguide modules.

The lower portion of the optical coupler is formed by laying out the obtained Y-junction modules and connection optical waveguide modules so that they are symmetrical about the longitudinal axis.

Figure 6:
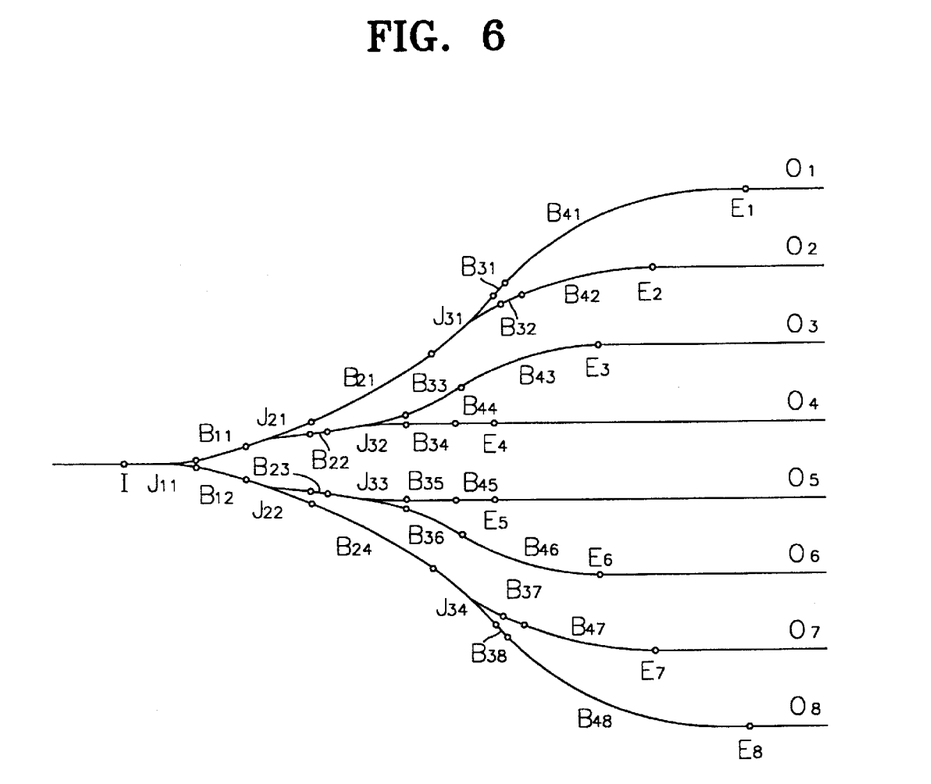
FIG. 6 is a view illustrating a 1×8 optical coupler, in accordance with the principles of the present invention.

FIG. 6 shows a 1×8 optical coupler according to the present invention. The input optical waveguide and the output optical waveguides are parallel to the longitudinal axis, and the interval between adjacent output optical waveguides is 250 micrometers ($\mu$m). Each Y-junction optical waveguide module has a length $L_J$ of 1700 $\mu$m, a half width $P_J$ of 14.8 $\mu$m, and a branching angle $\theta_J$ of 1.028 degrees (1.028°). The radius of curvature of the connection optical waveguide module is 50 millimeters (R=50 mm). The length (from I to $E_1$) of the improved optical coupler is determined by the outermost path, which is 15 millimeters. This is shorter than the length of an unimproved optical coupler which is not manufactured in a manner according to the present invention. Therefore, the improved optical coupler, manufactured in accordance with the present invention, has a length of 15 millimeters. The unimproved optical coupler, which is not manufactured in accordance with the present invention, has a length of 22 millimeters.

Figure 7A:
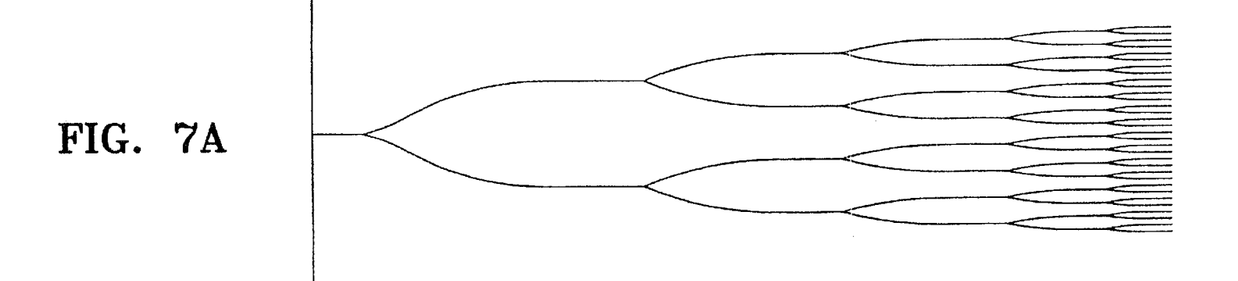
FIG. 7A illustrates a length of an unimproved 1×32 optical coupler.
Figure 7B:
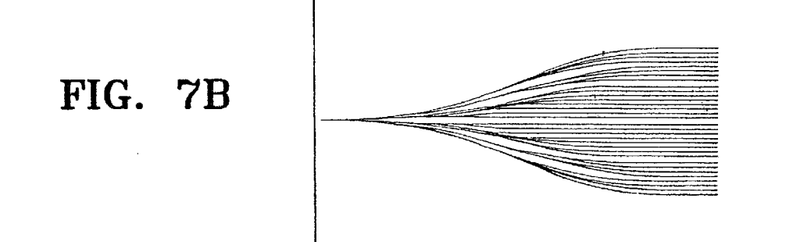
FIG. 7B illustrates a length of an improved 1×32 optical coupler, in accordance with the principles, of the present invention.

FIG. 7 shows the comparison of the length of an improved 1×32 optical coupler according to the present invention with the length of an unimproved 1×32 optical coupler. Here, FIG. 7A shows the case of an unimproved optical coupler having a length of 67 millimeters, and FIG. 7B shows the case of an improved optical coupler according to the present invention having a length of 31 millimeters.

In the present invention, a polynomial arc optical waveguide is used as the connection optical waveguide module, which is formed by replacing the start and end points of a circular arc optical waveguide by polynomial curve waveguides (hereinafter, referred to as P-curve waveguides).

Figure 8:
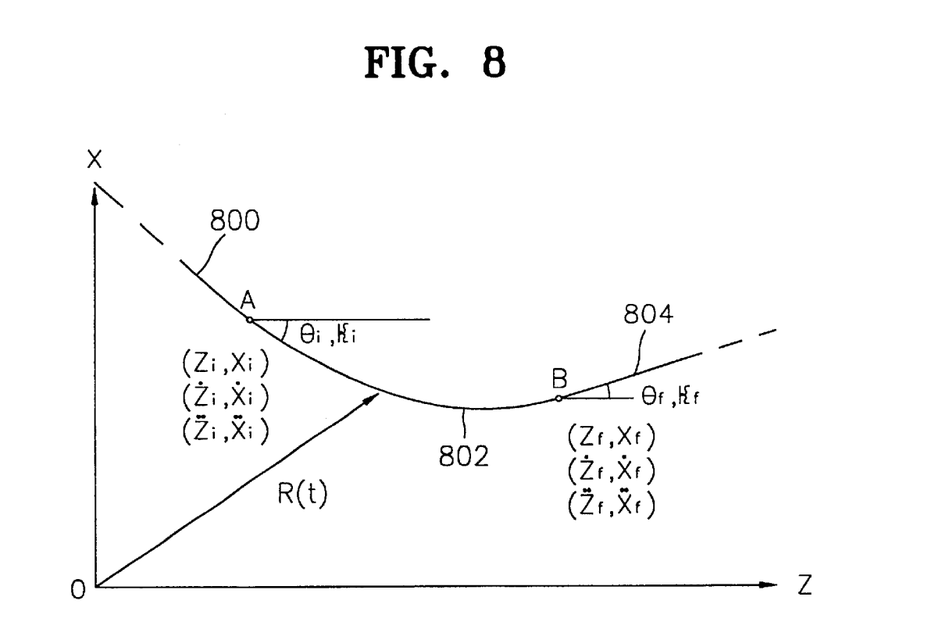
FIG. 8 is a view illustrating part of a P-curved optical waveguide.

The P-curved optical waveguide, which has been proposed by F. Ladoucer, can change the curvature along the path of the optical waveguide. FIG. 8 shows part of the P-curved optical waveguide. As shown in FIG. 8, in order to prevent a curved waveguide 802 connecting two straight line optical waveguides 800 and 804 from having transition loss, the coordinates, inclination and curvature of the first optical waveguide 800 should be consistent with those of the curved optical waveguide 802 at the junction A between the end point of the first straight line optical waveguide 800 and the start point of the curved optical waveguide 802. Also, the coordinates, inclination and curvature of the curved optical waveguide 802 must be consistent with those of the second straight line optical waveguide 804 at the junction B between the end point of the curved optical waveguide 802 and the start point of the second straight line optical waveguide 804. In order to apply the above-described boundary conditions, a path vector $R(t)$ is expressed by the following polynomial 12 with respect to a parameter (t):

$$\vec{R}(t) = z(t)\vec{u}_z + x(t)\vec{u}_x \quad (12)$$

wherein:

$$\vec{u}_z$$

and $$\vec{u}_x$$

denote the unit vectors of the Z axis and the X axis, respectively.

Since the above-described boundary condition provides 6 boundary conditions for each coordinate, the polynomial 12 is preferably a fifth degree polynomial. Accordingly, $z(t)$ and $x(t)$ are obtained by the following Equation 13:

$$z(t) = \sum_{n=0}^{5} a_n t^n \quad (13)$$

$$x(t) = \sum_{n=0}^{5} b_n t^n$$

When t is zero at the junction A, and t is L at the junction B, the following algebraic Equation 14 is obtained from the above-described boundary conditions:

$$\begin{bmatrix} 1 & 0 & 0 & 0 & 0 & 0 \\ 0 & 1 & 0 & 0 & 0 & 0 \\ 0 & 0 & 2 & 0 & 0 & 0 \\ 1 & L & L^2 & L^3 & L^4 & L^5 \\ 0 & 1 & 2L & 3L^2 & 4L^3 & 5L^4 \\ 0 & 0 & 2 & 6L & 12L^2 & 20L^3 \end{bmatrix} \begin{bmatrix} a_0 \\ a_1 \\ a_2 \\ a_3 \\ a_4 \\ a_5 \end{bmatrix} = \begin{bmatrix} z_i \\ \dot{z}_i \\ \ddot{z}_i \\ z_f \\ \dot{z}_f \\ \ddot{z}_f \end{bmatrix} \quad (14)$$

Here, dotting over each term in the right matrix indicates differentiation with respect to (t), and each term is shown by the following Equation 15:

$$z_i = z_i, \quad \dot{z}_i = \cos\theta_i, \quad \ddot{z}_i = -\chi_i \sin\theta_i$$

$$x_i = x_i, \quad \dot{x}_i = \sin\theta_i, \quad \ddot{x}_i = \chi_i \cos\theta_i$$

$$z_f = z_f, \quad \dot{z}_f = \cos\theta_f, \quad \ddot{z}_f = -\chi_f \sin\theta_f$$

$$x_f = x_f, \quad \dot{x}_f = \sin\theta_f, \quad \ddot{x}_f = \chi_f \cos\theta_f \quad (15)$$

wherein $\chi_i$ and $\chi_f$ are curvatures of the start and end points of the circular arc optical waveguide, respectively.

$a_0$ through $a_5$ can be obtained from Equations 14 and 15.

$$\begin{bmatrix} a_0 \\ a_1 \\ a_2 \\ a_3 \\ a_4 \\ a_5 \end{bmatrix} = \begin{bmatrix} 1 & 0 & 0 & 0 & 0 & 0 \\ 0 & 1 & 0 & 0 & 0 & 0 \\ 0 & 0 & \frac{1}{2} & 0 & 0 & 0 \\ -\frac{10}{L^3} & -\frac{6}{L^2} & -\frac{3}{2L} & \frac{10}{L^3} & -\frac{4}{L^2} & \frac{1}{2L} \\ \frac{15}{L^4} & \frac{8}{L^3} & \frac{3}{2L^2} & -\frac{15}{L^4} & \frac{7}{L^3} & -\frac{1}{L^2} \\ -\frac{6}{L^5} & -\frac{3}{L^4} & -\frac{1}{2L^3} & \frac{6}{L^5} & -\frac{3}{L^4} & \frac{1}{2L^3} \end{bmatrix} \begin{bmatrix} z_i \\ \dot{z}_i \\ \ddot{z}_i \\ z_f \\ \dot{z}_f \\ \ddot{z}_f \end{bmatrix} \quad (16)$$

$b_0$ through $b_5$ are also obtained by the same method, as shown in the following Equation 17:

$$\begin{bmatrix} b_0 \\ b_1 \\ b_2 \\ b_3 \\ b_4 \\ b_5 \end{bmatrix} = \begin{bmatrix} 1 & 0 & 0 & 0 & 0 & 0 \\ 0 & 1 & 0 & 0 & 0 & 0 \\ 0 & 0 & \frac{1}{2} & 0 & 0 & 0 \\ -\frac{10}{L^3} & -\frac{6}{L^2} & -\frac{3}{2L} & \frac{10}{L^3} & -\frac{4}{L^4} & \frac{1}{2L} \\ \frac{15}{L^4} & \frac{8}{L^3} & \frac{3}{2L^2} & -\frac{15}{L^4} & \frac{7}{L^3} & -\frac{1}{L^2} \\ -\frac{6}{L^5} & -\frac{3}{L^4} & -\frac{1}{2L^3} & \frac{6}{L^5} & -\frac{3}{L^4} & \frac{1}{2L^3} \end{bmatrix} \begin{bmatrix} x_i \\ \dot{x}_i \\ \ddot{x}_i \\ x_f \\ \dot{x}_f \\ \ddot{x}_f \end{bmatrix} \quad (17)$$

Figure 9:
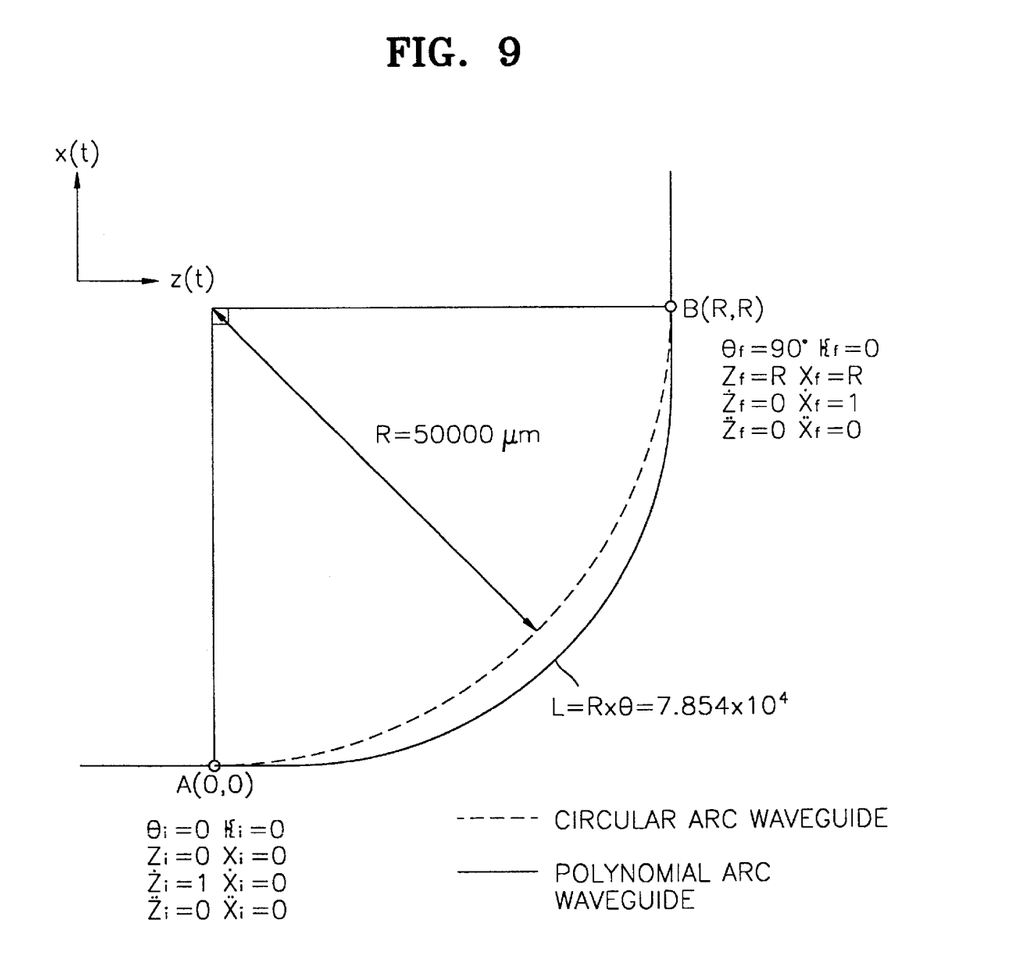
FIG. 9 is a view illustrating a circular arc optical waveguide having a radius of curvature R of 5000 micrometers ($\mu m$) and an inside angle of 90 degrees (90°), and a polynomial arc (PA) optical waveguide.

A polynomial arc optical waveguide is a curved optical waveguide formed by connecting the start and end points of a circular optical waveguide in the shape of a P-curve. FIG. 9 shows a polynomial arc optical waveguide and a circular arc optical waveguide having a radius of curvature R of 50000 micrometers ($\mu$m) and an inside angle of 90 degrees (90°). Here, a dotted line indicates the circular arc optical waveguide, and a solid line indicates the polynomial arc optical waveguide. The boundary condition at the junctions A and B is determined by Equation 15, as in the following Equation 18:

$$z_i=0, \dot{z}_i=\cos\theta_i=1, \ddot{z}_i=-\chi_i\sin\theta_i=0$$

$$x_i=0, \dot{x}_i=\sin\theta_i=0, \ddot{x}_i=\chi_i\cos\theta_i=0$$

$$z_f=50000, \dot{z}_f=\cos\theta_f=0, \ddot{z}_f=-\chi_f\sin\theta_f=0$$

$$x_f=50000, \dot{x}_f=\sin\theta_f=1, \ddot{x}_f=\chi_f\cos\theta_f=0 \quad (18)$$

Since L is equal to R×θ, z(t) and x(t) are determined from Equations 13, 16 and 17, as in the following Equation 19:

$$z(t)=t+5.936\times10^{-11}t^3-3.198\times10^{-15}t^4+2.154\times10^{-20}t^5, 0\leq t\leq 7.854\times10^4$$

$$x(t)=3.836\times10^{-10}t^3-5.262\times10^{-15}t^4+2.154\times10^{-20}t^5, 0\leq t\leq 7.854\times10^4 \quad (19)$$

The polynomial arc optical waveguide shown in FIG. 9 is obtained by drawing the trajectory of the path vector $\vec{R}(t)$ of Equation 12 while increasing the parameter t of Equation 19 from the start point of a connection optical waveguide, that is, 0, to L ($7.854\times10^4$).

The optical coupler is manufactured by fabricating a patterned mask including an input optical waveguide, a plurality of output optical waveguides, and Y-junction optical waveguide modules and connection optical waveguide modules having positions and lengths designed as above, and forming the mask pattern on a substrate.

In the present invention, an optical coupler is manufactured using Y-junction optical waveguide modules and connection optical waveguide modules, such that various Y-junction optical waveguide structures can be designed. Also, the degree of freedom upon layout of modules is increased, so that design of the optical coupler is easy. Therefore, an improved optical coupler which is shorter than an unimproved optical coupler can be manufactured, which increases the yield.

The foregoing paragraphs describe the details of an optical coupler and a method of manufacturing the same, and more particularly, describe the details of an optical coupler having Y-junction optical waveguides between input and output optical waveguides, and curved optical waveguides connected to the Y-junction optical waveguides, and a method of manufacturing the same.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus, comprising:
   an optical coupler dividing an optical signal into a plurality of N optical signals and outputting the N optical signals, said optical coupler further comprising:
   an input optical waveguide receiving the optical signal;
   a plurality of N output optical waveguides, each one of said N output optical waveguides outputting a respective one of the N optical signals, each adjacent one of said N output optical waveguides being separated by an equal distance;
   a plurality of Y-junction optical waveguides being arranged in a plurality of m stages, each one of said Y-junction optical waveguides dividing a received optical signal into two optical signals; and
   a plurality of curved optical waveguides being alternately connected to said Y-junction optical waveguides, at least one of said curved optical waveguides being connected between said Y-junction optical waveguides in an m-th stage and said output optical waveguides;
   when a guiding direction of the optical signal is set to be a longitudinal axis and when a junction between said input optical waveguide and a first stage Y-junction optical waveguide is set to be a starting location, said Y-junction optical waveguides and said curved optical waveguides having predetermined positions and sizes corresponding to a minimized longest optical path among a plurality of N optical paths, each one of said N optical paths being measured from the starting location to a respective one of said N output optical waveguides;
   said predetermined positions and sizes being determined in dependence upon solutions to a plurality of preset equations, said predetermined positions and sizes not being determined in dependence upon a trial-and-error process.

2. The apparatus of claim 1, further comprising said Y-junction optical waveguide in a first stage being adjacent to said input optical waveguide.

3. The apparatus of claim 1, further comprising said Y-junction optical waveguides in the m-th stage being adjacent to said curved optical waveguides followed by said output optical waveguides.

4. The apparatus of claim 1, each one of said Y-junction optical waveguides further comprising one inlet receiving signals and two outlets outputting signals.

5. The apparatus of claim 4, further comprising each one of said Y-junction optical waveguides having a predetermined structure corresponding to a length and a width, and further corresponding to an angle formed between said two outlets.

6. The apparatus of claim 1, further comprising each respective one of said curved optical waveguides having a size determined by a radius of curvature and an inside angle of said respective curved optical waveguide.

7. The apparatus of claim 6, further comprising each respective one of said curved optical waveguides having a trajectory formed according to values obtained from longitudinal and lateral axis polynomials having coefficients, the coefficients satisfying predetermined boundary conditions to prevent transition loss of an optical signal from occurring at junctions of said curved optical waveguides, while changing a parameter value of the polynomials from zero to the length value of each of said curved optical waveguides, said plurality of preset equations including said longitudinal and lateral axis polynomials.

8. The apparatus of claim 1, further comprising each respective one of said curved optical waveguides having a trajectory determined by a radius of curvature and an inside angle of said respective curved optical waveguide.

9. The apparatus of claim 8, further comprising each respective one of said curved optical waveguides having a trajectory formed according to values obtained from longitudinal and lateral axis polynomials having coefficients, the coefficients of each term of each equation being determined by boundary conditions at said inlet and said outlets to prevent transition loss of an optical signal from occurring at junctions of said curved optical waveguides, while changing a parameter value of the polynomials from zero to the length value of each of said curved optical waveguides, said plurality of preset equations including said longitudinal and lateral axis polynomials.

10. A method, comprising:
designing a pattern mask for an optical coupler including an input optical waveguide, a plurality of output optical waveguides, each adjacent one of said output optical waveguides being separated by an equal distance, a plurality of Y-junction optical waveguides configured in a plurality of stages dividing an optical signal received by said input optical waveguide into two optical signals at each stage, and a plurality of curved optical waveguides alternately connected to said Y-junction optical waveguides, at least one of said curved optical waveguides being connected between one of said Y-junction optical waveguides at a last stage and one of said output optical waveguides;

determining lengths, widths, and dividing angles of each of said Y-junction optical waveguides, and forming Y-junction optical waveguide modules having sizes corresponding to said determined lengths, widths, and dividing angles of said Y-junction optical waveguides;

forming connection optical waveguide modules having sizes corresponding to a radius of curvature and inside angle of each of said curved optical waveguides, said connection optical waveguide modules connecting said Y-junction optical waveguide modules to each other and connecting said Y-junction optical waveguide modules of said last stage to said output optical waveguides;

arranging said Y-junction optical waveguide modules and said connection optical waveguide modules between said input optical waveguide and said output optical waveguides, after determining lengths of said connection optical waveguide modules and positions of said Y-junction optical waveguides and said connection optical waveguide modules so that longitudinal distance between a starting location and each of said output optical waveguides is minimized, when a junction between said input optical waveguide and a first stage Y-junction optical waveguide module is set to be said starting location, and a guiding direction of the optical signal is set to be along longitudinal axis; and manufacturing said pattern mask according to said arranging, and manufacturing said optical coupler according to said pattern mask;

said determining, forming, and arranging being performed in dependence upon solutions to a plurality of equations, said determining, forming, and arranging not being performed in dependence upon a trial-and-error process.

11. The method of claim 10, said arranging further comprising:
determining a radius of curvature of each of said connection optical waveguide modules, and obtaining lengths of said connection optical waveguide modules from said determined radii of curvature and an unknown inside angle of each of said connection optical waveguide modules;

obtaining longitudinal and lateral distances from said starting location to each of said output optical waveguides, from the length of each of said Y-junction optical waveguide modules and the length of each of said connection optical waveguide modules;

obtaining inside angles which minimize the longitudinal distances while satisfying a predetermined restriction condition, when the lateral distances to each of said output optical waveguides are determined according to interval between adjacent output optical waveguides among said output optical waveguides; and obtaining position of each of said Y-junction optical waveguide modules, and position and length of each of said connection optical waveguide modules from said obtained inside angles.

12. The method of claim 11, further comprising a plurality of optical paths, each respective one of said optical paths beginning at said starting location and ending at a respective one of said output optical waveguides.

13. The method of claim 12, further comprising said restriction condition corresponding to a sum of said dividing angles of said Y-junction optical waveguides and said inside angles of said connection optical waveguide modules included in each one of said plurality of optical paths ranging between said starting location and each of said output optical waveguides is zero on each one of said optical paths.

14. A method, comprising the steps of:
designing a pattern mask for an optical coupler including an input optical waveguide, a plurality of N output optical waveguides, each adjacent one of said N output optical waveguides being separated by an equal distance, a plurality of Y-junction optical modules configured in a plurality of m stages dividing an optical signal received by said input optical waveguide into two optical signals at each stage, and a plurality of connection optical waveguide modules alternately connected to said Y-junction optical waveguide modules, at least one of said connection optical waveguide modules being connected between one of said Y-junction optical waveguide modules at an m-th stage and one of said output optical waveguides, forming a plurality of N optical paths, each respective one of said optical paths beginning at a starting location and ending at a respective one of said output optical waveguides, manufacturing said optical coupler according to said pattern mask;

determining lengths, widths, dividing angles, and positions of said Y-junction optical waveguide modules;

determining sizes, radii of curvature, inside angles, and positions of said connection optical waveguide modules, said connection optical waveguide modules connecting said Y-junction optical waveguide modules to each other and connecting said Y-junction optical waveguide modules of said m-th stage to said output optical waveguides;

arranging said Y-junction optical waveguide modules and said connection optical waveguide modules between said input optical waveguide and said output optical waveguides, said arranging being performed in dependence upon said determined lengths, widths, dividing angles, and positions of said Y-junction optical waveguide modules and in dependence upon said determined sizes, radii of curvature, inside angles, and positions of said connection optical waveguide modules so that longitudinal distance between a starting location and each of said output optical waveguides is minimized, when a junction between said input optical waveguide and a first-stage Y-junction optical waveguide module is set to be said starting location, and a guiding direction of the optical signal is set to be along longitudinal axis; and manufacturing said pattern mask according to said arranging;

said steps of determining and arranging not being performed in dependence upon a trial-and-error process.

15. The method of claim 14, said arranging step further comprising the substeps of:

determining a radius of curvature of each of said connection optical waveguide modules, and obtaining lengths of said connection optical waveguide modules from said determined radii of curvature and an unknown inside angle of each of said connection optical waveguide modules;

obtaining longitudinal and lateral distances from said starting location to each of said output optical waveguides, from the length of each of said Y-junction optical waveguide modules and the length of each of said connection optical waveguide modules;

obtaining inside angles minimizing the longitudinal distances while satisfying a first restriction condition, when the lateral distances to each of said output optical waveguides are determined according to interval between adjacent output optical waveguides among said output optical waveguides; and obtaining positions of each of said Y-junction optical waveguide modules, and positions and lengths of each of said connection optical waveguide modules from said obtained inside angles.

16. The method of claim 15, further comprising said first restrictive condition corresponding to a plurality of N separate and distinct resultant values, each one of said N resultant values being zero; and each respective one of said N resultant values being a sum of said dividing angles of said Y-junction optical waveguide modules and said inside angles of said connection optical waveguide modules included in each respective one optical path of said N optical paths ranging between said starting location and a respective one of said N output optical waveguides.

17. The method of claim 16, said step of obtaining said inside angles further comprising obtaining a plurality of inside angle sets which satisfy said minimizing of the longitudinal distances and determining an inside angle set which minimizes the longest path among paths obtained from the inside angle sets.

18. The method of claim 17, said step of determining positions of said connection optical waveguide modules further comprising a substep of arranging said connection optical waveguide modules so that said connection optical waveguide modules satisfy a second restriction condition which minimizes a transition loss of light which passes through a junction of each of said connection optical waveguide modules.

19. The method of claim 18, further comprising said second restriction condition including a coordinate match, a tangent inclination match, and a curvature match between said inlet and outlet of each module connected at each junction.

20. The method of claim 19, further comprising each of said connection optical waveguide modules having a trajectory formed according to values obtained from longitudinal and lateral axis polynomials having coefficients, the coefficients being determined by said second restriction condition at junctions of each of said connection optical waveguide modules, while changing a parameter value of the polynomials from zero to the length value of each of said connection optical waveguide modules.

21. An apparatus, comprising:

an optical coupler dividing an optical signal into a plurality of N optical signals and outputting the N optical signals, said optical coupler further comprising:

an input optical waveguide receiving the optical signal;

a plurality of N output optical waveguides, each one of said N output optical waveguides outputting a respective one of the N optical signals, each adjacent one of said N output optical waveguides being separated by an equal distance;

a plurality of Y-junction optical waveguides being arranged in a plurality of m stages, each one of said Y-junction optical waveguides having one inlet and two outlets, at each of said stages each one of said Y-junction optical waveguides receiving an optical signal at said one inlet, dividing the received optical signal into first and second optical signals, and outputting the first and second optical signals from said two outlets respectively; and a plurality of curved optical waveguides connecting said Y-junction optical waveguides and conveying the optical signals, said plurality of curved optical waveguides including a first curved optical waveguide;

when a junction between said input optical waveguide and a first stage Y-junction optical waveguide is set to be a starting location, said Y-junction optical waveguides and said curved optical waveguides having predetermined positions and sizes, said predetermined positions and said predetermined sizes minimizing a length of a longest optical path among a plurality of N optical paths, a length of each respective one of said plurality of N optical paths being measured from said starting location to a respective one of said N output optical waveguides;

said predetermined position and size of said first curved optical waveguide being identified by solving a first plurality of equations corresponding to a circular arc optical waveguide, said first plurality of equations including a first equation and a second equation;

said first equation being $$\text{sign}(\theta_B) = \begin{cases} 1 & \theta_B > 0 \\ 0 & \theta_B = 0 \\ -1 & \theta_B < 0; \end{cases}$$

said second equation being $$\bar{b} = \bar{a} + \begin{pmatrix} \cos\theta_I & -\sin\theta_I \\ \sin\theta_I & \cos\theta_I \end{pmatrix} \begin{pmatrix} r\sin\theta_B \\ r - r\cos\theta_B \end{pmatrix}$$

$$= \bar{a} + \begin{pmatrix} 2r\cos\left(\frac{\theta_B}{2} + \theta_I\right)\sin\frac{\theta_B}{2} \\ 2r\sin\left(\frac{\theta_B}{2} + \theta_I\right)\sin\frac{\theta_B}{2} \end{pmatrix};$$

when a guiding direction of the optical signal is set to be a longitudinal axis, said circular arc optical waveguide having an optical inlet $\bar{a}$, an optical outlet $\bar{b}$, a tangent angle $\theta_I$ formed between the longitudinal axis and the optical inlet $\bar{a}$, a tangent angle $\theta_O$ formed between the longitudinal axis and the optical outlet $\bar{b}$, an inside angle $\theta_B$ obtained by subtracting $\theta_I$ from $\theta_O$, with a radius of curvature R of a circle having an arc that connects inlet $\bar{a}$ to outlet $\bar{b}$ and that corresponds to said circular arc optical waveguide, a value r having a sign and denoting the radius of curvature R with the sign, r being equal to R·sign($\theta_B$), the sign of r being the sign of curvature of said circular arc optical waveguide from inlet $\bar{a}$ to outlet $\bar{b}$, the sign of r being positive when the tangent angle of said circular arc optical waveguide increases along path from inlet $\bar{a}$ to outlet $\bar{b}$ and being negative when the tangent angle of said circular arc optical waveguide decreases along path from inlet $\bar{a}$ to outlet $\bar{b}$;

the sign of r corresponding to solution of said first equation;

position of said outlet $\bar{b}$ in relation to position of said inlet $\bar{a}$ corresponding to solution of said second equation;

said N optical paths of said optical coupler being formed by sequentially connecting said Y-junction optical waveguides and said curved optical waveguides, said N optical paths being expressed by a second plurality of equations derived from said first and second equations.

22. The apparatus of claim 21, further comprising a curvature-matched polynomial arc optical waveguide being substituted for said circular arc optical waveguide, said substituting being performed after said predetermined position and size of said first curved optical waveguide are identified by said solving of said first plurality of equations corresponding to said circular arc optical waveguide.

23. The apparatus of claim 21, further comprising:

said plurality of Y-junction optical waveguides including a first Y-junction optical waveguide having one inlet $\bar{d}$, an upper outlet $\bar{e}$, and a lower outlet $\bar{f}$, said two outlets corresponding to an outlet coordinate ($\bar{e}$, $\bar{f}$), position of outlet coordinate ($\bar{e}$, $\bar{f}$) in relation to position of inlet coordinate $\bar{d}$ of said first Y-junction optical waveguide being determined by solving a Y-junction equation, said Y-junction equation being $$\bar{e} = \bar{d} + \begin{pmatrix} \cos\theta_R & -\sin\theta_R \\ \sin\theta_R & \cos\theta_R \end{pmatrix} \begin{pmatrix} L_J \\ P_J \end{pmatrix}$$

$$= \bar{d} + \begin{pmatrix} L_J\cos\theta_R - P_J\sin\theta_R \\ L_J\sin\theta_R + P_J\cos\theta_R \end{pmatrix}$$

$$\bar{f} = \bar{d} + \begin{pmatrix} \cos\theta_R & -\sin\theta_R \\ \sin\theta_R & \cos\theta_R \end{pmatrix} \begin{pmatrix} L_J \\ -P_J \end{pmatrix}$$

$$= \bar{d} + \begin{pmatrix} L_J\cos\theta_R + P_J\sin\theta_R \\ L_J\sin\theta_R - P_J\cos\theta_R \end{pmatrix};$$

said first Y-junction optical waveguide being rotated by $\theta_R$ from the longitudinal axis, said first Y-junction optical waveguide having a length $L_j$, a width $2P_j$, and an angle $\theta_j$ formed between an axis of symmetry along said length of said first Y-junction optical waveguide and tangent line at said upper outlet $\bar{e}$.

24. The apparatus of claim 23, the value of N being equal to $2^m$.

25. The apparatus of claim 22, said predetermined positions, said predetermined sizes, and said N optical paths being obtained by using said first and second pluralities of equations.

26. The apparatus of claim 25, said predetermined positions, said predetermined sizes, and said N optical paths all being obtained without using trial and error.

* * * * *